G. C. RAEGER.
EXPANSION AND FASTENING DEVICE.
APPLICATION FILED JULY 18, 1914.
1,146,651.
Patented July 13, 1915.
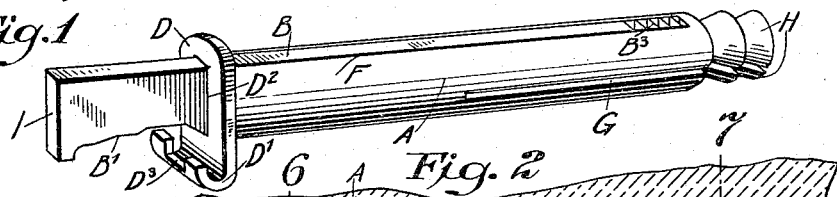
Fig. 1
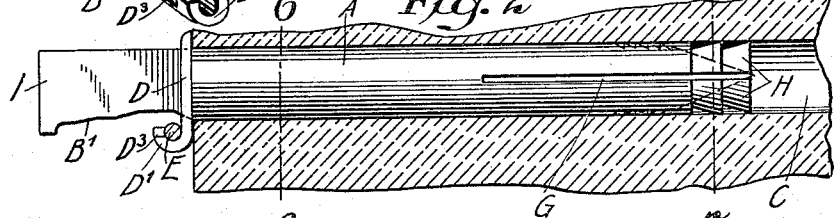
Fig. 2
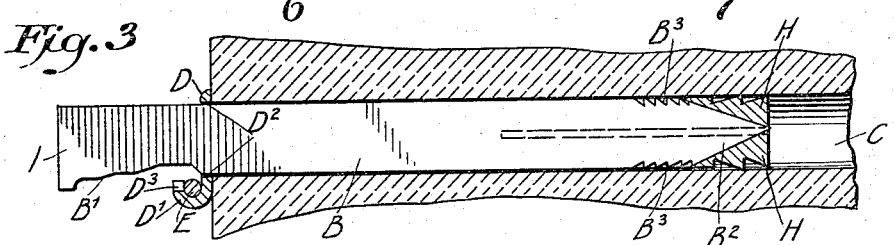
Fig. 3
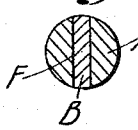
Fig. 6
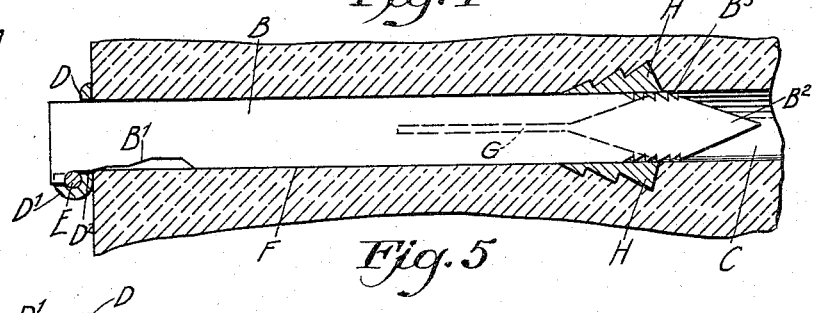
Fig. 4
Fig. 5
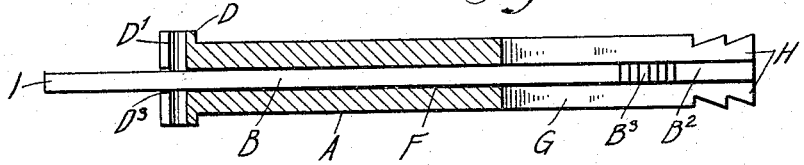
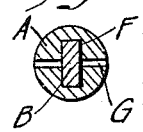
Fig. 7
WITNESSES
INVENTOR
George C. Raeger
BY
ATTORNEYS

UNITED STATES PATENT OFFICE.

GEORGE C. RAEGER, OF WATERLOO, NEW YORK.

EXPANSION AND FASTENING DEVICE.

1,146,651. Specification of Letters Patent. Patented July 13, 1915.

Application filed July 18, 1914. Serial No. 851,738.

*To all whom it may concern:*

Be it known that I, GEORGE C. RAEGER, a citizen of the United States, and a resident of Waterloo, in the county of Seneca and State of New York, have invented a new and Improved Expansion and Fastening Device, of which the following is a full, clear, and exact description.

The invention relates to expansion bolts and nails and its object is to provide a new and improved expansion and fastening device more especially designed for use in concrete walls, posts and other structures, and arranged to permit of conveniently placing the expansion and fastening device in a hole in the structure, locking the device therein and at the same time supporting and fastening a pipe, rod, wire or other article securely in position.

In order to accomplish the desired result, use is made of an expansible member adapted to be inserted in a hole and provided with a head having receiving and supporting means for an article to be supported and fastened in place, and a driving and locking member adapted to be driven into the said expansible member to expand the latter in the hole and lock the article in position in the said receiving means.

A practical embodiment of the invention is represented in the accompanying drawings forming a part of this specification, in which similar characters of reference indicate corresponding parts in all the views.

Figure 1 is a perspective view of the expansion and fastening device; Fig. 2 is a side elevation of the same in position in the hole; Fig. 3 is a longitudinal section of the same; Fig. 4 is a similar view of the same in expanded and fastened position; Fig. 5 is a plan view of the expansion and fastening device with the expansible member in section; Fig. 6 is a cross section of the expansion and fastening device on the line 6—6 of Fig. 2; and Fig. 7 is a similar view of the same on the line 7—7 of Fig. 2.

The expansion and fastening device consists essentially of two parts, namely, an expansible supporting member A and a driving and locking member B. The expansible and supporting member A is adapted to be inserted into a hole C formed in a concrete or other structure, as plainly indicated in Figs. 2, 3 and 4. The outer end of the expansible and supporting member A is provided with a head D adapted to abut against the outer face of the structure to limit the inward movement of the said member. The head D is provided at its lower end with an outwardly and upwardly curved seat D' for the reception of a pipe, rod, wire, or other article E to be supported and fastened in place.

The expansible and supporting member A is provided with two lengthwise extending slots F and G disposed in planes extending at a right angle one relative to the other, as will be readily understood by reference to Fig. 7. The slot F extends from the front end of the member A in a rearward direction to within a distance of the rear end of the said member A, and the front end of the slot F registers with an opening $D^2$ formed in the head D and through which opening the member B is inserted into the slot F. The other slot G extends from the rear end of the member A forwardly and terminates a distance beyond the rear end of the other slot F. By the arrangement described the slots F and G intersect and jaws H are provided at the rear end of the member A, the jaws H being provided with peripheral teeth adapted to penetrate the wall of the hole C when the jaws are expanded as hereinafter more fully explained.

The driving and locking member B is provided at its outer end with a head I adapted to be struck by a hammer or other tool to drive the member B lengthwise in the slot F. The member B has the bottom edge B' adjacent the head I in the form of a series of bevels or steps to engage the top of the article E when driving the member B in position in the member A so that the article E is pressed down firmly in the seat D' and is securely locked therein. The front edge of the bearing D' is preferably provided with a cut-out portion $D^3$ for the passage of the lower end of the head I (see Fig. 4) to engage the front edge of the article E with a view to securely lock the article in place in the seat D'. The rear end of the driving and locking member B terminates in a point $B^2$ adapted to pass between the jaws H to expand the same when driving the member B home so that the jaws H readily embed themselves in the wall of the hole C, as plainly shown in Fig. 4. The member B is preferably flat and of a width corresponding to the diameter of the expansible and supporting member A and the upper and lower edges of the said member B are preferably provided adjacent the point B² with teeth B³ adapted to engage the wall of the hole C with a view to prevent accidental outward movement of the member B after the same has been driven home.

In using the expansion and fastening device the expansible and supporting member A is placed in position in the hole C and then the article E is engaged with the seat D'. The member B is now inserted through the head D into the slot F with the edge B' downward and then the head I is given a blow with a hammer or other tool to drive the member B inward in the member A. In doing so the point B² passes between the jaws H and expands the same, that is, embeds the jaws in the wall of the hole C, as plainly indicated in Fig. 2. While driving the member B home the edge B' engages the top of the article E and presses the same down firmly into the seat D' in which the article E is securely locked by the lower end of the head I engaging the front of the said article. If the article E is not to be held very tight in the bearing D' the member B is not entirely driven home so that the edge B' but lightly engages the top of the article E. It will be noticed that when the jaws H are spread apart and embed themselves in the concrete material they exert an inward pull on the member A to draw the head D thereof firmly against the outer face of the structure, to prevent accidental loosening of the fastening device and the article supported thereby.

The expansion and fastening device shown and described is very simple and durable in construction and can be readily applied to walls of concrete and other structures for fastening the desired article in position.

Having thus described my invention, I claim as new and desire to secure by Letters Patent:

1. An expansion and fastening device, comprising an expansible member adapted to be inserted in a hole and provided with a head having on its outer face receiving means for an article to be supported and fastened in place, and a driving and locking member adapted to be driven into the said expansible member to expand the latter in the hole and having a portion coacting with the receiving means to lock the article in position in the said receiving means.

2. An expansion and fastening device, comprising an expansible member adapted to be inserted in a hole and provided at its outer end with a head having a seat for an article to be supported and fastened in place, and a driving and locking member adapted to be driven into the said expansible member to expand the same, the said driving member having a beveled edge adapted to engage the article to drive the same home in the seat and to lock it therein.

3. An expansion and fastening device, comprising an expansible member adapted to be inserted in a hole and provided at its outer end with a head having a seat for an article to be supported and fastened in place, and a driving and locking member adapted to be driven into the said expansible member to expand the same, the said driving member having a beveled edge adapted to engage the article to drive the same home in the seat and to lock it therein, the said driving and locking member having a head at its outer end adjacent the said beveled edge.

4. An expansion and fastening device, comprising an expansible member having two slots disposed in planes at an angle one to the other, and of which one slot extends lengthwise from the front end of the member to a point at a distance from the rear end thereof, and the other slot extends forwardly from the rear end of the member to form expanding jaws, and a driving and expanding member adapted to be driven rearwardly in the said first-named slot, the rear end of the said driving and expanding member being pointed to engage the jaws and expand the same.

5. An expansion and fastening device, comprising an expansible member having two slots disposed in planes at an angle one to the other and of which one slot extends lengthwise from the front end of the member to a point at a distance from the rear end thereof and the other slot extends forwardly from the rear end of the member to form expanding jaws, and a driving and expanding member adapted to be driven rearwardly in the said first-named slot, the rear end of the said driving and expanding member being pointed to engage the jaws and expand the same, the said jaws being provided with exterior teeth adapted to embed themselves in the wall of the hole on expanding the jaws.

6. An expansion and fastening device, comprising an expansible member having two slots disposed in planes at an angle one to the other and of which one slot extends lengthwise from the front end of the member to a point at a distance from the rear end thereof, and the other slot extends forwardly from the rear end of the member to form expanding jaws, and a driving and expanding member adapted to be driven rearwardly in the said first-named slot, the rear end of the said driving and expanding member being pointed to engage the jaws and expand the same, the rear edges of the said driving and expanding member being provided with teeth adjacent the point to prevent accidental return movement of the said driving and expanding member.

7. An expansion and fastening device, comprising an expansible member adapted to be inserted in a hole and provided at its outer end with a head having a seat for an article to be supported and fastened in place, and a driving and locking member adapted to be driven into the said expansible member to expand the same, the said driving member having a beveled edge adapted to engage the article to drive the same home in the seat and to lock it therein, the said seat having a cut-out portion at its front edge and the lower end of the head of the said driving and locking member being adapted to pass into the said cut-out portion.

In testimony whereof I have signed my name to this specification in the presence of two subscribing witnesses.

GEORGE C. RAEGER.

Witnesses:
 THEO. G. HOSTER,
 PHILIP D. ROLLHAUS.